United States Patent
McVay et al.

(10) Patent No.: US 9,752,050 B2
(45) Date of Patent: Sep. 5, 2017

(54) COATING COMPOSITIONS FOR FOOD AND BEVERAGE PACKAGES

(71) Applicant: PPG Industries Ohio, Inc., Cleveland, OH (US)

(72) Inventors: Robert McVay, Cincinnati, OH (US); Alyssa McGhee, Loveland, OH (US)

(73) Assignee: PPG industries Ohio, Inc., Cleveland, OH (US)

( * ) Notice: Subject to any disclaimer, the term of this patent is extended or adjusted under 35 U.S.C. 154(b) by 136 days.

(21) Appl. No.: 14/788,894

(22) Filed: Jul. 1, 2015

(65) Prior Publication Data
US 2017/0002229 A1    Jan. 5, 2017

(51) Int. Cl.
| | | |
|---|---|---|
| *B05D 3/02* | (2006.01) |
| *B21D 51/26* | (2006.01) |
| *B65D 1/12* | (2006.01) |
| *B65D 25/14* | (2006.01) |
| *C09D 133/26* | (2006.01) |
| *C09D 177/00* | (2006.01) |
| *C09D 165/02* | (2006.01) |
| *C09D 133/06* | (2006.01) |
| *C09D 133/08* | (2006.01) |
| *C09D 4/06* | (2006.01) |
| *C08K 5/00* | (2006.01) |

(52) U.S. Cl.
CPC ........... *C09D 165/02* (2013.01); *B21D 51/26* (2013.01); *B65D 1/12* (2013.01); *B65D 25/14* (2013.01); *C09D 133/06* (2013.01); *C09D 133/08* (2013.01); *B05D 3/02* (2013.01); *C08K 5/00* (2013.01); *C09D 4/06* (2013.01); *C09D 133/26* (2013.01); *C09D 177/00* (2013.01)

(58) Field of Classification Search
None
See application file for complete search history.

(56) References Cited

U.S. PATENT DOCUMENTS

| | | | |
|---|---|---|---|
| 2003/0077469 A1 | 4/2003 | Chasser et al. | |
| 2007/0032606 A1 | 2/2007 | McVay | |
| 2010/0243506 A1* | 9/2010 | Cleaver | B65D 25/14 206/524.6 |
| 2014/0162005 A1 | 6/2014 | Most et al. | |
| 2016/0122581 A1* | 5/2016 | You | C09D 5/106 428/35.8 |

FOREIGN PATENT DOCUMENTS

JP    S62 84146 A    4/1987

* cited by examiner

*Primary Examiner* — Ramsey Zacharia
(74) *Attorney, Agent, or Firm* — William J. Uhl

(57) ABSTRACT

Coating compositions for coating the interior of food or beverage packages are disclosed. The compositions are substantially free of bisphenol A and reaction products thereof. The compositions comprise:
  (a) a resinous binder comprising:
    (i) a polymer containing reactive functional groups,
    (ii) an aminoplast curing agent containing functional groups that are reactive with the functional groups of (i), and
    (iii) a monomeric phenol;
  (b) a colorant.

18 Claims, No Drawings

COATING COMPOSITIONS FOR FOOD AND BEVERAGE PACKAGES

FIELD OF THE INVENTION

The present invention relates to coating compositions that are useful for coating packages of various sorts such as food and beverage containers. The compositions are particularly useful for colored coatings on the food or beverage-contacting surfaces of packages.

BACKGROUND OF THE INVENTION

Coatings are typically applied to the interior of metal food and beverage containers to prevent the contents from contacting the metal surface of the container. Contact with certain foods, particularly salty products such as soups, can cause the metal container to corrode. This corrosion results in contamination and deterioration in the appearance and taste of the food or beverage product.

Many of the coating compositions for food and beverage containers are based on polyether resins that are based on polyglycidyl ethers of bisphenol A. Such resins provide excellent corrosion resistance. However, bisphenol A in container coatings either as bisphenol A itself (BPA) or reaction products thereof, such as diglycidyl ethers of bisphenol A (BADGE), epoxy novolak resins and polyols prepared with bisphenol A are problematic. Although the balance of scientific evidence available to date indicates that small trace amounts of BPA or BADGE that might be released from existing coatings does not pose health risks to humans, these compounds are nevertheless perceived by some as being an endocrine-disrupting compound that is eluted from the food or beverage container and absorbed into the food or beverage within the container. Consequently, there is a strong desire to eliminate these compounds from coatings for food and beverage containers. Accordingly, what are desired are container coating compositions for food and beverage containers that do not contain extractable quantities of BPA, BADGE or other derivatives of BPA and yet have excellent corrosion resistance.

Coatings based on resinous vehicles comprising polymers with reactive functional groups such as hydroxyl-functional (meth)acrylic polymers and formulated with phenolplast curing agents provide coatings with excellent corrosion resistance. However, when cured, such coatings are discolored. Certain customers of can manufacturers require a white coating that is not possible with phenolplast curing agents that cure to a yellow or gold-colored coating. Aminoplast curing agents can be used to prepare white or other colored coatings without discoloration. However, the corrosion resistance of these coatings is relatively poor. What is needed is a coating composition substantially free of bisphenol A and reaction products thereof that, when cured, produces a coating that is not discolored yet has good corrosion resistance.

SUMMARY OF THE INVENTION

The present invention provides a coating composition being substantially free of bisphenol A and reaction products thereof comprising:
(a) a resinous binder comprising:
 (i) a polymer containing reactive functional groups,
 (ii) an aminoplast curing agent containing functional groups that are reactive with the functional groups of (i), and
 (iii) a monomeric phenol;
(b) a colorant.

The invention also provides for a coated package or a portion thereof having a food or beverage-contacting surface comprising the coating composition described above applied to at least a portion of the food or beverage-contacting surface of the package.

The invention also provides a method of coating comprising: (a) providing a substrate with a food or beverage-contacting surface, (b) applying the coating composition described above to the food or beverage-contacting surface, and (c) forming the substrate into a package before or after application of the coating composition.

DETAILED DESCRIPTION

As indicated above, one essential component of the coating composition is a polymer containing reactive functional groups. An example of such a polymer is a (meth)acrylic polymer, particularly an at least partially neutralized acid functional (meth)acrylic polymer containing reactive functional groups. Examples of such functional groups are hydroxyl that are reactive with the aminoplast curing agent and N-alkoxymethylol groups that are also reactive with the aminoplast curing agent and with each other.

Among the monomers used in preparing the (meth)acrylic polymer are ethylenically unsaturated carboxylic acids such as acrylic acid, methacrylic acid, itaconic acid, crotonic acid, and maleic acid.

The ethylenically unsaturated carboxylic acid is used in amounts of 20 to 35 percent, such as 22 to 33 percent by weight based on total weight of monomer used in preparing the (meth)acrylic polymer.

The monomer with the reactive functional group can be selected from hydroxyalkyl esters of (meth)acrylic acid, typically containing 2 to 4 carbon atoms in the hydroxyalkyl group and from N-alkoxymethylol groups derived from (meth)acrylamide containing from 1 to 4 carbon atoms in the N-alkoxy group.

Examples include hydroxyethyl (meth)acrylate and hydroxypropyl (meth)acrylate and monomers of the structure:

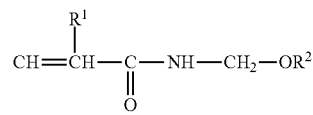

where $R^1$ is hydrogen or methyl and $R^2$ is lower alkyl containing from 1 to 4 carbons. Specific examples of such monomers are N-ethoxymethyl (meth)acrylamide and N-butoxymethyl (meth)acrylamide.

The monomers containing the reactive functional groups are typically present in amounts of 0.2 to 30, such as 5 to 40 percent by weight based on total weight of monomers used in preparing the (meth)acrylic polymer.

Other monomers are usually used in preparing the (meth)acrylic polymer. Examples include aromatic monomers such as styrene and vinyl toluene that are present in amounts of up to 10, such as 35 percent by weight based on total weight of monomers used in preparing the (meth)acrylic polymer; alkyl esters of (meth)acrylic acid containing from 1 to 8 carbon atoms in the alkyl group, such as methyl (meth) acrylate, butyl (meth)acrylate and 2-ethylhexyl (meth)acrylate that are present in amounts up to 15, such as 45 percent by weight based on total weight of monomers used in preparing the (meth)acrylic polymer.

The (meth)acrylic polymer is formed by free radical polymerization in the presence of a free radical initiator. Examples of initiators are azo compounds, such as, for example, alpha,alpha'-azobis(isobutyronitrile). Other useful initiators are tertiary-butyl perbenzoate, tertiary-butyl pivalate, isopropyl percarbonate, benzoyl peroxide and cumene hydroperoxide.

The (meth)acrylic polymer typically has a weight average molecular weight of 15,000 to 100,000, as determined by gel permeation chromatography using a polystyrene standard.

The partially neutralized acid functional polymer containing functional groups (i) is usually present in the composition in amounts of 20 to 50, such as 25 to 30 percent by weight based on weight of resin solids in the coating composition. Amounts less than 20 percent by weight do not provide stable dispersions, whereas amounts greater than 50 percent by weight result in blistering of the film upon baking.

Component (ii) is an aminoplast resin. Examples of aminoplast resins are those which are formed by reacting a triazine such as melamine or benzoguanamine with formaldehyde. Preferably, these condensates are etherified typically with methanol, ethanol, butanol including mixtures thereof. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1123, available from Allenex AB.

The amount of component (ii) is usually 15 to 60 percent by weight, such as 20 to 50 percent by weight based on weight of resin solids in the coating composition. If the amount of component (ii) exceeds 60 percent by weight, the coating becomes brittle and will fracture when the end, lid, is seamed on the can. Amounts less than 15 percent by weight result in poor corrosion resistance.

Component (iii) is a monomeric phenol. Examples of suitable monomeric phenols are phenol resorcinol and hydroquinone. The monomeric phenol may be substituted and be a compound of the structure:

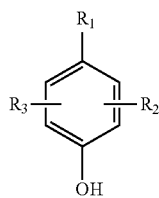

Typically, $R_1$ is $C_1$ to $C_4$ alkyl such as methyl or $C_1$ to $C_4$ alkoxy such as methoxy; $R_2$ is hydrogen or $C_1$ to $C_4$ alkyl such as t-butyl, and $R_3$ is $C_1$ to $C_4$ alkyl such as t-butyl.

Specific examples of substituted monomeric phenols are butylated hydroxyanisole and butylated hydroxytoluene having the following structures:

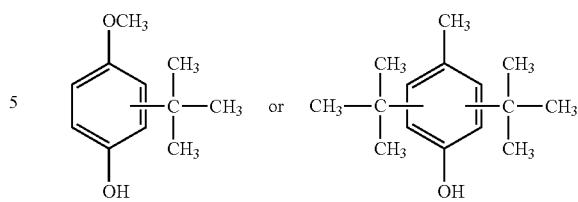

including mixtures thereof.

The monomeric phenol surprisingly provides improved corrosion resistance without yellowing. It is typically present in the coating composition in amounts of 2 to 30, such as 4 to 25 percent by weight based on weight of resin solids in the coating composition. Amounts less than 2 percent by weight provide insufficient corrosion resistance, whereas amounts greater than 30 percent by weight result in unacceptable amount of oven condensate.

The resin solids content of the coating composition is typically from 10 to 30, such as 15 to 20 percent by weight based on total weight of the composition.

The coating compositions also contain a colorant. The colorant can be added to the coating in any suitable form, such as discrete particles, dispersions, solutions and/or flakes. A single colorant or a mixture of two or more colorants can be used in the coatings of the present invention. Suitable colorants are listed in U.S. Pat. No. 8,614,286, column 7, line 2 through column 8, line 65, which is incorporated by reference herein. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

Titanium dioxide pigments are used to achieve the white interior coatings on food and beverage containers and are most prone to discoloration. Typically, the coloring pigment is present in the composition in amounts of 5 to 25, such as 10 to 20 percent by weight based on total weight of the composition.

Besides (i), (ii) and (iii), optional resinous ingredients can be included in the resinous phase. An example includes amine functional polyamides, which further enhance adhesion and corrosion resistance of the coating.

The amine-terminated polyamides are described in U.S. Pat. No. 7,475,786. When present, the amine-terminated polyamides are present in amounts of up to 20 percent by weight based on weight of resin solids.

Another optional ingredient that is typically present in the coating composition is a catalyst to increase the rate of cure or crosslinking of the coating compositions. Generally acid catalyst may be used and is typically present in amounts of about 0.05 to 5 percent by weight. Examples of suitable catalyst are dodecyl benzene sulfonic acid, methane sulfonic acid, paratoluene sulfonic acid, dinonyl naphthalene disulfonic acid and phenyl phosphonic acid.

Another useful optional ingredient is a lubricant, for example, a wax which facilitates manufacture of metal closures by imparting lubricity to the sheets of the coated metal substrate. Preferred lubricants include, for example, carnauba wax and polyethylene-type lubricants. If used, the lubricant is preferably present in the coating compositions of at least 0.1 percent by weight based on weight of resin solids in the coating composition.

Surfactants can optionally be added to the coating composition to aid in flow and wetting of the substrate. Examples of suitable surfactants include, but are not limited to, nonyl phenol polyether and salts. If used, the surfactant is present in amounts of at least 0.01 percent and no greater than 10 percent based on weight of resin solids in the coating composition.

The compositions used in the practice of the invention are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions can also be substantially free and may be essentially free and may be completely free of bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above-mentioned compounds, derivatives or residues thereof.

The compositions of the present invention can be prepared according to methods well known in the art. For example, using an acid functional acrylic polymer as the resinous vehicle, the polymer is neutralized with an amine to between 20-80 percent of the total theoretical neutralization. The neutralized acrylic polymer is then dispersed in water followed by the addition of the pigment and optional resinous ingredients. The mixture is then ground in a media mill to form a paste that is added to a let-down tank containing the aminoplast crosslinker and water.

As mentioned above, the coating compositions of the present invention can be applied to packages of all sorts and are particularly well adapted for use on food and beverage containers (e.g., two-piece cans, three-piece cans, etc.).

The compositions can be applied to the food or beverage-contacting surface by any means known in the art such as roll coating, spraying and electrocoating. It will be appreciated that for two-piece food cans, the coating will typically be sprayed after the can is made. For three-piece food cans, a flat metal sheet or a coil metal strip will typically be roll coated with the coating composition and then the can body and/or can end will be formed. As noted above, the percent solids of the composition can be adjusted based upon the means of application. The coating can be applied to a dry film weight of 24 mgs/4 in$^2$ to 12 mgs/4 in$^2$, such as 20 mgs/4 in$^2$ to 14 mgs/4 in$^2$.

After application, the coating is then cured. Cure is effected by methods standard in the art. For coil coating, this is typically a short dwell time (i.e., 9 seconds to 2 minutes) at high heat (i.e., 485° F. (252° C.) peak metal temperature); coated metal sheets typically cure longer (i.e., 10 minutes) but at lower temperatures (i.e., 400° F. (204° C.) peak metal temperature). For spray applied coatings on two-piece cans, the cure can be from 5 to 8 minutes, with a 90-second bake at a peak metal temperature of 415° F. (213° C.) to 425° F. (218° C.).

Any substrate material used for the formation of food or beverage containers can be treated according to the present methods. Particularly suitable substrates include aluminum, tin-plated steel, tin-free steel and black-plated steel.

EXAMPLES

The following examples are offered to aid in understanding of the present invention and are not to be construed as limiting the scope thereof. Unless otherwise indicated, all parts and percentages are by weight.

Four (4) Examples are presented. Example 1 is the control showing a coating composition being substantially free of bisphenol A and reaction products thereof comprising a (meth)acrylic polymer containing hydroxy and carboxylic acid groups, an aminoplast curing agent and titanium dioxide pigment. Examples 2, 3 and 4 show similar compositions but with increasing amounts of butylated hydroxytoluene. The four (4) coating compositions were spray applied to a 2-piece can, cured, filled with chicken noodle soup, sealed and exposed to pack testing, after which, the corrosion resistance of the various coatings was determined.

Example 1 (Control)

A coating composition was prepared from the following ingredients:

| Ingredient | Parts by Weight | Percent by Weight Based on Total Coating Composition Weight | Percent by Weight Based on Weight of Resin Solids |
| --- | --- | --- | --- |
| Cowles Grind | | | |
| Acrylic Resin 50% resin solids in butanol[1] | 769.24 | 14.94 | 43.95 |
| Dimethylethanolamine | 43.97 | 0.85 | — |
| Titanium Dioxide | 700.00 | 13.59 | — |
| N-Amyl alcohol | 97.55 | 1.89 | — |
| Epikure 3100 80% resin solids in isopropanol[2] | 12.74 | 0.25 | 1.11 |
| Deionized water | 496.60 | 9.64 | — |
| Let Down in Thin Tank | | | |
| Benzoguanamine 1[3] | 100.57 | 1.95 | 10.99 |
| Benzoguanamine 2[4] | 609.52 | 11.84 | 43.95 |
| Caprylic acid | 25.32 | 0.49 | — |
| Deionized water | 2294.17 | 44.55 | — |
| | 5149 | 100 | 100 |

[1]Acrylic Resin was prepared using conventional solution polymerization techniques using a peroxide catalyst. The resin had a methacrylic acid/styrene/butyl acrylate/ethyl acrylate weight ratio of 25/30/20/25 and an $M_w$ of about 35,000.
[2]Amine terminated polyamide from Momentive.
[3]CYMEL 1123 from Allenex.
[4]CYMEL 5011 from Allenex.

The procedure for preparing the coating composition is as generally described above.

Example 2

An Example similar to Example 1 was prepared but containing 5.5 percent by weight based on weight of resin solids in the coating composition of butylated hydroxytoluene. The coating composition was prepared as generally described in Example 1 from the following mixture of ingredients:

| Ingredient | Parts by Weight | Percent by Weight Based on Total Coating Composition Weight | Percent by Weight Based on Weight of Resin Solids |
|---|---|---|---|
| Cowles Grind | | | |
| Acrylic polymer of Example 1 | 730.22 | 14.49 | 40.32 |
| Butylated hydroxytoluene[5] | 52.05 | 1.03 | 5.50 |
| Dimethylethanolamine | 41.74 | 0.83 | — |
| Titanium Dioxide | 700.00 | 13.89 | — |
| Epikure 3100 | 12.74 | 0.25 | 1.08 |
| Deionized water | 496.60 | 9.85 | — |
| Let Down in Thin Tank | | | |
| Benzoguanamine 1 | 100.57 | 2.00 | 10.62 |
| Benzoguanamine 2 | 609.52 | 12.09 | 42.48 |
| Caprylic acid | 25.32 | 0.50 | — |
| Deionized water | 2271.54 | 45.07 | — |
| | 5040.30 | 100.00 | 100.00 |

[5]Available from Sasol AB.

Example 3

An Example similar to Example 1 was prepared but containing 11.7 percent by weight based on weight of resin solids in the coating composition of butylated hydroxytoluene. The coating composition was prepared as generally described in Example 1 from the following mixture of ingredients:

| Ingredient | Parts by Weight | Percent by Weight Based on Total Coating Composition Weight | Percent by Weight Based on Weight of Resin Solids |
|---|---|---|---|
| Cowles Grind | | | |
| Acrylic polymer of Example 1 | 729.15 | 13.81 | 43.20 |
| Butylated hydroxytoluene | 103.32 | 1.96 | 11.70 |
| Dimethylethanolamine | 41.67 | 0.79 | — |
| Titanium Dioxide | 700.00 | 13.26 | — |
| Epikure 3100 | 31.70 | 0.60 | 2.87 |
| Deionized water | 597.83 | 11.32 | — |
| Let Down in Thin Tank | | | |
| Benzoguanamine 1 | 68.24 | 1.29 | 7.73 |
| Benzoguanamine 2 | 461.32 | 8.74 | 34.49 |
| Caprylic acid | 25.32 | 0.48 | — |
| Deionized water | 2521.75 | 47.76 | — |
| | 5280.30 | 100.00 | 100.00 |

Example 4

An Example similar to Example 1 was prepared but containing 19.68 percent by weight based on weight of resin solids in the coating composition of butylated hydroxytoluene. The coating composition was prepared as generally described in Example 1 from the following mixture of ingredients:

| Ingredient | Parts by Weight | Percent by Weight Based on Total Coating Composition Weight | Percent by Weight Based on Weight of Resin Solids |
|---|---|---|---|
| Cowles Grind | | | |
| Acrylic polymer of Example 1 | 730.22 | 13.96 | 39.37 |
| Butylated hydroxytoluene | 190.95 | 3.65 | 19.68 |
| Dimethylethanolamine | 41.74 | 0.80 | — |
| Titanium Dioxide | 700.00 | 13.38 | — |
| Epikure 3100 | 30.60 | 0.58 | 2.52 |
| Deionized water | 597.83 | 11.43 | — |
| Let Down in Thin Tank | | | |
| Benzoguanamine 1 | 68.24 | 1.30 | 7.03 |
| Benzoguanamine 2 | 461.32 | 8.82 | 31.39 |
| Caprylic acid | 25.32 | 0.48 | — |
| Deionized water | 2386.02 | 45.60 | — |
| | 5232.24 | 100.00 | 100.00 |

Examples 1-4 were spray applied to the interior of three (3) separate 211×400 electro tin-plated steel D&I cans (A, B and C) at a film weight of approximately 310 mg. The spray-applied coating was cured by heating at 425° F. (218° C.) for 5 minutes. The cans were filled to ½" headspace with chicken noodle soup, sealed, and put in retort at 250° F. (121° C.) for 1 hour and held at 120° F. (49° C.). The cans were removed from storage, cooled and cut open with four vertical cuts from top to bottom and flattened to resemble a cross and the interior coated surfaces of the can evaluated for corrosion protection, that were measured on a sale of 0 to 100%. A reading of "100%" indicates the coating is completely corroded, observed by bubbling or blistering of the film in all areas. A "0" indicates no evidence of corrosion. Evidence of corrosion was evaluated in the head space area that is the most difficult part of the 2-piece can to get corrosion resistance because it contains the least amount of tin plating due to the drawing process. The results are reported below:

| Example | Can | Corrosion in Head Space | Average |
|---|---|---|---|
| 1 | A | 80% | 90% |
| | B | 100% | |
| | C | 90% | |
| 2 | A | 35% | 40% |
| | B | 50% | |
| | C | 35% | |
| 3 | A | 30% | 35% |
| | B | 50% | |
| | C | 25% | |
| 4 | A | 3% | 18% |
| | B | 33% | |
| | C | 18% | |

As used herein, the following terms have the following meanings.

The term "alkyl or alkyl group" refers to a straight or branched chain saturated aliphatic group that may be substituted with hetero atoms such as nitrogen, oxygen and sulfur atoms.

The term "food-contacting surface" refers to the surface of a package such as an inner surface of a food or beverage container that is in contact with, or intended for contact with, a food or beverage product. By way of example, an interior surface of a metal substrate of a food or beverage container, or a portion thereof such as a can end or a can body, is a food-contacting surface even if the interior metal surface is coated with a coating composition.

The term "package" means anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The term "colorant" means any substance that imparts color and/or other opacity and/or other visual effect to the composition.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers) and oligomers.

Acrylic and methacrylic monomers and polymers are designated as (meth)acrylic monomers and polymers.

The term "comprises" and variations thereof do not have a limiting meaning where these terms appear in the description and claims.

As used herein, "a", "an", "the", "at least one" and "one or more" are used interchangeably. Thus, for example, a coating composition that comprises "a" polyether can be interpreted to mean that the coating composition includes "one or more" polyethers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. A coating composition being substantially free of bisphenol A and reaction products thereof comprising:
   (a) a resinous binder comprising:
      (i) a (meth)acrylic polymer containing N-alkoxymethyl (meth)acrylamide reactive functional groups,
      (ii) an aminoplast curing agent containing functional groups that are reactive with the functional groups of (i),
      (iii) 2 to 30 percent by weight based on weight of resin solids of a monomeric phenol, and
      (iv) an amine-terminated polyamide;
   (b) a colorant.

2. The coating composition of claim 1 in which (ii) is a condensate of benzoguanamine and formaldehyde.

3. The coating composition of claim 1 in which (iii) is a compound of the structure:

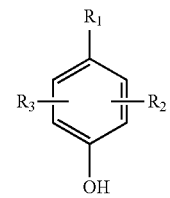

where $R_1$ is H, alkyl or alkoxy; $R_2$ is H or alkyl, and $R_3$ is alkyl.

4. The coating composition of claim 3 in which $R_1$ is $C_1$ to $C_4$ alkyl or $C_1$ to $C_4$ alkoxy, $R_2$ is hydrogen or $C_1$ to $C_4$ alkyl, and $R_3$ is $C_1$ to $C_4$ alkyl.

5. The coating composition of claim 3 in which $R_1$ is methyl or methoxy, $R_2$ is hydrogen or $C_4$ alkyl, and $R_3$ is $C_4$ alkyl.

6. The coating composition of claim 3 in which (ii) is a compound having the following structure:

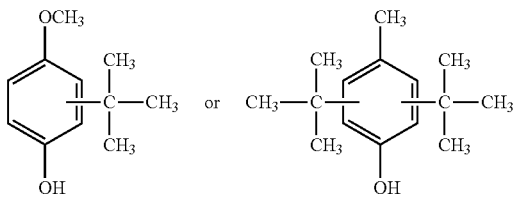

including mixtures thereof.

7. The coating composition of claim 1 in which (a) and (b) are dispersed in aqueous medium.

8. The coating composition of claim 1 in which (i) is present in the coating composition in amounts of 20 to 50 percent by weight based on weight of resin solids in the coating composition.

9. The coating composition of claim 1 in which (ii) is present in the coating composition in amounts of 20 to 50 percent by weight based on weight of resin solids in the coating composition.

10. The coating composition of claim 1 in which (iii) is present in the coating composition in amounts of 4 to 25 percent by weight based on weight of resin solids in the coating composition.

11. The coating composition of claim 1 which has a resin solids content of 15 to 20 percent by weight based on total weight of the composition.

12. The coating composition of claim 1 in which (b) is present in the coating composition in amounts of 10 to 20 percent by weight based on total weight of the composition.

13. A coated package or a portion thereof having a food or beverage-contacting surface comprising the coating composition of claim 1 applied to at least a portion of the food or beverage-contacting surface.

14. The coated package of claim 13 in which the package is an aluminum or steel container.

15. The coated container of claim 14 in which the container is a 2-piece or 3-piece can including a can end.

16. A method comprising:
    (a) providing a substrate having a food or beverage-contacting surface,
    (b) applying the coating composition of claim 1 to the food or beverage-contacting surface, and
    (c) forming the substrate into a package before or after application of the coating composition.

17. The method of claim 16 in which the substrate is a metal sheet or a coil metal strip, each of which are subsequently formed into a can or a can end.

18. The method of claim 16 in which the metal substrate is a 2-piece can.

\* \* \* \* \*